United States Patent
Wang et al.

(10) Patent No.: US 9,547,396 B2
(45) Date of Patent: Jan. 17, 2017

(54) IN-CELL MULTI-TOUCH PANEL SYSTEM WITH LOW NOISE AND TIME DIVISION MULTIPLEXING AND ITS DRIVING METHOD

(71) Applicant: Orise Technology Co., Ltd., Hsinchu (TW)

(72) Inventors: Hsin-Hao Wang, Tainan (TW); Yen-Lin Huang, Taipei (TW)

(73) Assignee: FOCALTECH SYSTEMS CO., LTD. (TW)

(*) Notice: Subject to any disclaimer, the term of this patent is extended or adjusted under 35 U.S.C. 154(b) by 240 days.

(21) Appl. No.: 14/288,661

(22) Filed: May 28, 2014

(65) Prior Publication Data
US 2014/0354590 A1 Dec. 4, 2014

(30) Foreign Application Priority Data
May 28, 2013 (TW) .............................. 102118746 A

(51) Int. Cl.
*G06F 3/044* (2006.01)
(52) U.S. Cl.
CPC ..... *G06F 3/044* (2013.01); *G06F 2203/04104* (2013.01)
(58) Field of Classification Search
CPC ..................... G06F 3/044; G06F 2203/04104
USPC .................................................. 345/173, 178
See application file for complete search history.

(56) References Cited

U.S. PATENT DOCUMENTS

| | | | | |
|---|---|---|---|---|
| 6,239,788 B1* | 5/2001 | Nohno | .................. | G06F 3/0412 178/18.03 |
| 8,334,851 B2* | 12/2012 | Harada | ............... | G02F 1/13338 345/173 |
| 8,633,905 B2* | 1/2014 | Harada | ................. | G06F 3/0412 345/173 |
| 8,976,123 B2* | 3/2015 | Noguchi | ............. | G02F 1/13338 345/173 |
| 9,178,510 B2* | 11/2015 | Lin | ........................ | G06F 3/0416 |
| 9,209,802 B1* | 12/2015 | Maharyta | ............. | H03K 17/955 |
| 2008/0157893 A1* | 7/2008 | Krah | ..................... | G06F 3/0418 331/177 R |
| 2010/0328239 A1* | 12/2010 | Harada | ................. | G06F 3/0412 345/173 |
| 2012/0050217 A1 | 3/2012 | Noguchi et al. | | |
| 2013/0021267 A1* | 1/2013 | Lin | ....................... | G06F 3/0416 345/173 |
| 2013/0176276 A1* | 7/2013 | Shepelev | ................ | G06F 3/044 345/174 |

(Continued)

*Primary Examiner* — Lun-Yi Lao
*Assistant Examiner* — Kelly B Hegarty
(74) *Attorney, Agent, or Firm* — Bacon & Thomas, PLLC

(57) ABSTRACT

An in-cell multi-touch panel system includes: an in-cell touch display panel, a touch display control system. In a first frame time interval, the touch display control system drives the in-cell touch display panel and samples the sensing voltage from the in-cell touch display panel to determine whether there is an approaching external object and noise interference. In a second frame time interval, the touch display control system finds out a frequency with minimum noise for use as a frequency of the touch driving signal when the noise interference exists. In a third frame time interval, the touch display control system is based on the frequency with minimum noise to correspondingly generate the touch driving signal so as to determine whether there is an approaching external object.

18 Claims, 12 Drawing Sheets

(56) References Cited

U.S. PATENT DOCUMENTS

| | | | |
|---|---|---|---|
| 2013/0222322 A1* | 8/2013 | Drew | G06F 3/044 345/174 |
| 2013/0293511 A1* | 11/2013 | Nam | G06F 3/0418 345/174 |
| 2014/0009408 A1* | 1/2014 | Lee | G06F 3/041 345/173 |
| 2014/0125623 A1* | 5/2014 | Atkinson | G06F 3/044 345/174 |
| 2014/0354590 A1* | 12/2014 | Wang | G06F 3/044 345/174 |

* cited by examiner

IN-CELL MULTI-TOUCH PANEL SYSTEM WITH LOW NOISE AND TIME DIVISION MULTIPLEXING AND ITS DRIVING METHOD

BACKGROUND OF THE INVENTION

1. Field of the Invention

The present invention relates to the technical field of touch panels and, more particularly, to an in-cell multi-touch panel system with low noise and time division multiplexing and its driving method.

2. Description of Related Art

The principle of touch panels is based on different sensing manners to detect a voltage, current, acoustic wave, or infrared to thereby detect the coordinates of touch points on a screen where a finger or other medium touches. For example, a resistive touch panel uses a voltage difference between the upper and lower electrodes to compute the position of a pressed point for detecting the location of the touch point, and a capacitive touch panel uses a capacitance change generated in an electrostatic combination of the arranged transparent electrodes and a human body to generate a current or voltage for detecting touching coordinates.

Upon the principle, the capacitive touch technologies can be divided into a surface capacitive touch sensing and a projected capacitive touch sensing. The surface capacitive touch sensing has a simple configuration, so that the multi-touch implementation is not easy, and the problems of electromagnetic disturbance (EMI) and noises are difficult to be overcome. Therefore, the popular trend of capacitive touch development is toward the projected capacitive sensing.

The projected capacitive touch sensing can be divided into a self capacitance and a mutual capacitance sensing. The self capacitance sensing indicates that a capacitance coupling is generated between a touch object and a conductor line, and a touch occurrence is decided by measuring a capacitance change of the conductor line. The mutual capacitance sensing indicates that a capacitance coupling is generated between two adjacent conductor lines when a touch occurs.

A typical self capacitance sensing senses the grounded capacitance (Cs) on every conductor line. Thus, a change of the grounded capacitance is used to determine whether an object approaches to the capacitive touch panel. The self capacitance or the grounded capacitance is not a physical capacitor, but parasitic and stray capacitance on every conductor line. FIG. 1 is a schematic view of a typical self capacitance sensing. As shown in FIG. 1, at the first period, the driving and sensing devices 110 in a first direction drive the conductor lines in the first direction in order to charge the self capacitance (Cs) of the conductor lines in the first direction. At the second period, the driving and sensing devices 110 sense the voltages on the conductor lines in the first direction to thereby obtain m data. At the third period, the driving and sensing devices 120 in a second direction drive the conductor lines in the second direction in order to charge the self capacitance of the conductor lines in the second direction. At the fourth period, the driving and sensing devices 120 sense the voltages on the conductor lines in the second direction to thereby obtain n data. Therefore, a total of m+n data can be obtained.

The typical self capacitance sensing of FIG. 1 connects both a driver circuit and a sensor circuit on the same conductor line in order to drive the conductor line and sense a signal change on the same conductor line to thereby decide the magnitude of the self capacitance.

Another way of driving the typical capacitive touch panel is to sense the magnitude change of mutual capacitance Cm to thereby determine whether an object approaches to the touch panel. Similarly, the mutual capacitance Cm is not a physical capacitor but a mutual capacitance between the conductor lines in the first direction and in the second direction. FIG. 2 is a schematic diagram of a typical mutual capacitance sensing. As shown in FIG. 2, the drivers 210 are located on the first direction (Y), and the sensors 220 are located on the second direction (X). At the upper half of the first period T1, the drivers 210 drive the conductor lines 230 in the first direction and use the voltage Vy_1 to charge the mutual capacitance (Cm) 250, and at the lower half, all sensors 220 sense voltages (Vo_1, Vo_2, ..., Vo_n) on the conductor lines 240 in the second direction to thereby obtain n data. Accordingly, the m×n data can be obtained after m driving periods.

A typical flat touch display is produced by stacking a touch panel directly over a flat display. Since the stacked touch panel is transparent, the image on the flat display can be displayed by passing through the stacked touch panel, and the touch panel can act as an input medium or interface.

However, such a stacking requires an increase of the weight of the touch panel, resulting in relatively increasing the weight of the flat display, which cannot meet with the compact requirement for current markets. For a further description, when the touch panel and flat display are stacked directly, the increased thickness reduces the transmittance of rays and increases the reflectivity and haziness, resulting in relatively reducing the display quality on the screen.

To overcome this, the embedded touch control technology is adapted. The currently developed embedded touch control technologies are essentially on-cell and in-cell technologies. The on-cell technology uses a projected capacitive touch technology to form sensors on the backside (i.e., a surface for attaching a polarized plate) of a color filter (CF) for being integrated into a color filter structure. The in-cell technology embeds sensors in an LCD cell to thereby integrate a touch element with a display panel such that the display panel itself is provided with a touch function without having to be attached or assembled to a touch panel. Such a technology typically is developed by a TFT LCD panel factory. The in-cell multi-touch panel technology is getting more and more mature, and since the touch function is directly integrated during a panel production process, without adding a layer of touch glass, the original thickness is maintained and the cost is reduced.

FIG. 3 is a schematic view of a configuration of a typical in-cell multi-touch panel 300. In FIG. 3, the panel 300 includes a lower polarizer 310, a lower glass substrate 320, a thin film transistor (TFT) or LTPS layer 330, a liquid crystal (LC) layer 340, a common voltage and touch driving layer 350, a color filter layer 360, an upper glass substrate 370, a sensing electrode layer 380, and an upper polarizer 390. As shown in FIG. 3, in order to save the cost, a touch sensor is integrated with an LCD panel, and the common voltage layer (Vcom) of the LCD panel is located at a layer as same as the drivers of the touch sensor, thereby forming the common voltage and touch driving layer 350. Thus, the cost saving is achieved. The sensing electrode layer 380 is located on the upper glass substrate 370. The TFT or LTPS layer 330 is constructed of thin film transistors (TFTs) or low-temperature poly-Si film transistors (LTPS) 332 and transparent electrodes 331.

As cited, the self capacitive sensing and the mutual capacitive sensing make use of the driver lines in a touch IC to input driving signals, and the sensing circuit can collect different charge generating voltage signals Vo_1-Vo_n from a capacitance change, so as to determine whether an object approaches to or touches touch sensors based on the signal change.

FIG. 4 is a schematic view of a capacitance of a typical in-cell touch display panel, where $C_{LC}$ indicates a capacitance between a thin film transistor (TFT) and a common voltage layer (Vcom), $C_{parasitism\ 1}$ indicates a capacitance between a sensing line of a touch integrated circuit (IC) and the TFT, and $C_{parasitism\ 2}$ indicates a capacitance between the sensing line of the touch IC and the common voltage layer Vcom. However, the panel is subjected to noises originated from various sources, such as noises generated by a source voltage of the TFT of the panel and the polarity inversion of the panel, which may seriously interfere the sensing lines of the touch IC and make a touch device to generate an erroneous coordinate determination and an instable problem. Thus, the system signal to noise ratio SNR is relatively reduced.

Therefore, the prior art typically adds digital and analog filters in the touch IC to eliminate the affection to the touch IC caused by the displaying and driving IC on the panel. However, the anti-noise capability of a filter is varied with different noise sources, so that the noise interference from the displaying and driving IC to the touch IC may not be effectively overcome.

In addition, the configuration of the in-cell multi-touch panel in FIG. 3 uses a time sharing to divide one frame into a display cycle and a touch cycle to thereby share the common voltage layer Vcom of the panel and the driving layer of the touch sensor, as shown in the timings of FIGS. 5(A) and 5(B).

As shown in FIG. 5(A), the time for one display frame is divided into one display cycle and one touch cycle, and the frame of the display panel is displayed in the display cycle before the touch sensing is performed in the touch cycle. In US 2012/0050217 entitled "Display device with touch detection function, control circuit, driving method of display device with touch detection function, and electronic unit", the timing of a first embodiment (shown in FIG. 8 of the patent publication) uses the same strategy as that in FIG. 5(A); i.e., the frame is displayed before the touch sensing is performed. Another time sharing is illustrated in FIG. 5(B), which divides the time for one line into a display cycle and a touch cycle, while performing a frame display on the panel first and then a touch sensing.

However, such a time sharing needs a driving IC to drive more and more pixels as a resolution of the panel becomes higher and higher, resulting in requiring longer and longer time. However, because the display frame rate has to be maintained at 60 Hz and over, i.e., 16.6 ms for each frame, it becomes difficult to perform image displaying and touch sensing in 16.6 ms since the resolution of the panel becomes higher and higher. Also, the resolution development is further limited, which becomes a serious problem to be solved. In addition, the electrical field has to continuously alternate the positive and negative polarities for the liquid crystals, so that the noise is relatively high in the panel, resulting in that a touch sensing circuit may make an erroneous determination and generate an instable touch coordinate.

Therefore, it is desirable to provide an improved in-cell multi-touch panel system to mitigate and/or obviate the aforementioned problems.

SUMMARY OF THE INVENTION

An object of the present invention is to provide an in-cell multi-touch panel system with low noise and time division multiplexing and its driving method, for allowing the common grounding signal (VCOM) on displaying and the touch driving signal (VIN) on touching to share the same layer of transparent electrical conductor to thereby save the cost, and to use different driving timings for concurrently driving the display and the touch control, so as to solve the prior problem in that the time for the display and touch control is insufficient.

Another object of the present invention is to provide an in-cell multi-touch panel system with low noise and time division multiplexing and its driving method, which can reduce the affection to a touch detector due to noises generated by the common voltage layer (Vcom), the source voltages of the TFTs on the LCD panel, and the polarity inversion of the panel, and increase the linearity and reliability of coordinate determination of touch points thereby further raising the system SNR.

In one aspect, the present invention provides an in-cell multi-touch panel system with low noise and time division multiplexing, which includes: an in-cell touch display panel for displaying an image signal and sensing an external object; and a touch display control system connected to the in-cell touch display panel for sequentially outputting a display driving signal to the in-cell touch display panel so as to display the image signal, and for sequentially outputting a touch driving signal to the in-cell touch display panel for sampling a sensing voltage from the in-cell touch display panel so as to determine whether there is an approaching external object. In a first frame time interval, the touch display control system drives the in-cell touch display panel and samples the sensing voltage from the in-cell touch display panel to determine whether there is an approaching external object and noise interference; in a second frame time interval, the touch display control system finds out a frequency with minimum noise for use as a frequency of the touch driving signal when the noise interference exists; in a third frame time interval, the touch display control system is based on the frequency with minimum noise to correspondingly generate the touch driving signal so as to determine whether there is an approaching external object.

In another aspect, the present invention provides a driving method for an in-cell multi-touch panel system with low noise and time division multiplexing including an in-cell touch display panel and a touch display control system. The method comprises the steps of: (A) selecting a frequency from a set of candidate frequencies to generate a display driving signal and a touch driving signal, such that the touch display control system sequentially outputs the display driving signal to the in-cell touch display panel for performing a display of an image signal, and sequentially outputs the touch driving signal to the in-cell touch display panel for sampling a sensing voltage from the in-cell touch display panel, so as to determine whether there is an approaching external object; (B) in a first frame time interval, sampling the sensing voltage from the in-cell touch display panel when the touch display control system drives the in-cell touch display panel, so as to determine whether there is an approaching external object and noise interference; (C) when there is noise interference, in a second frame time interval, using the touch display control system to change with the candidate frequencies and find out a frequency of the touch driving signal with minimum noise; and (D) in a third frame time interval, using the touch display control system to generate the touch driving signal corresponding to the frequency with minimum noise so as to determine whether an external object approaches to the in-cell touch display panel.

Other objects, advantages, and novel features of the invention will become more apparent from the following detailed description when taken in conjunction with the accompanying drawings.

DETAILED DESCRIPTION OF THE PREFERRED EMBODIMENT

Figure 6:
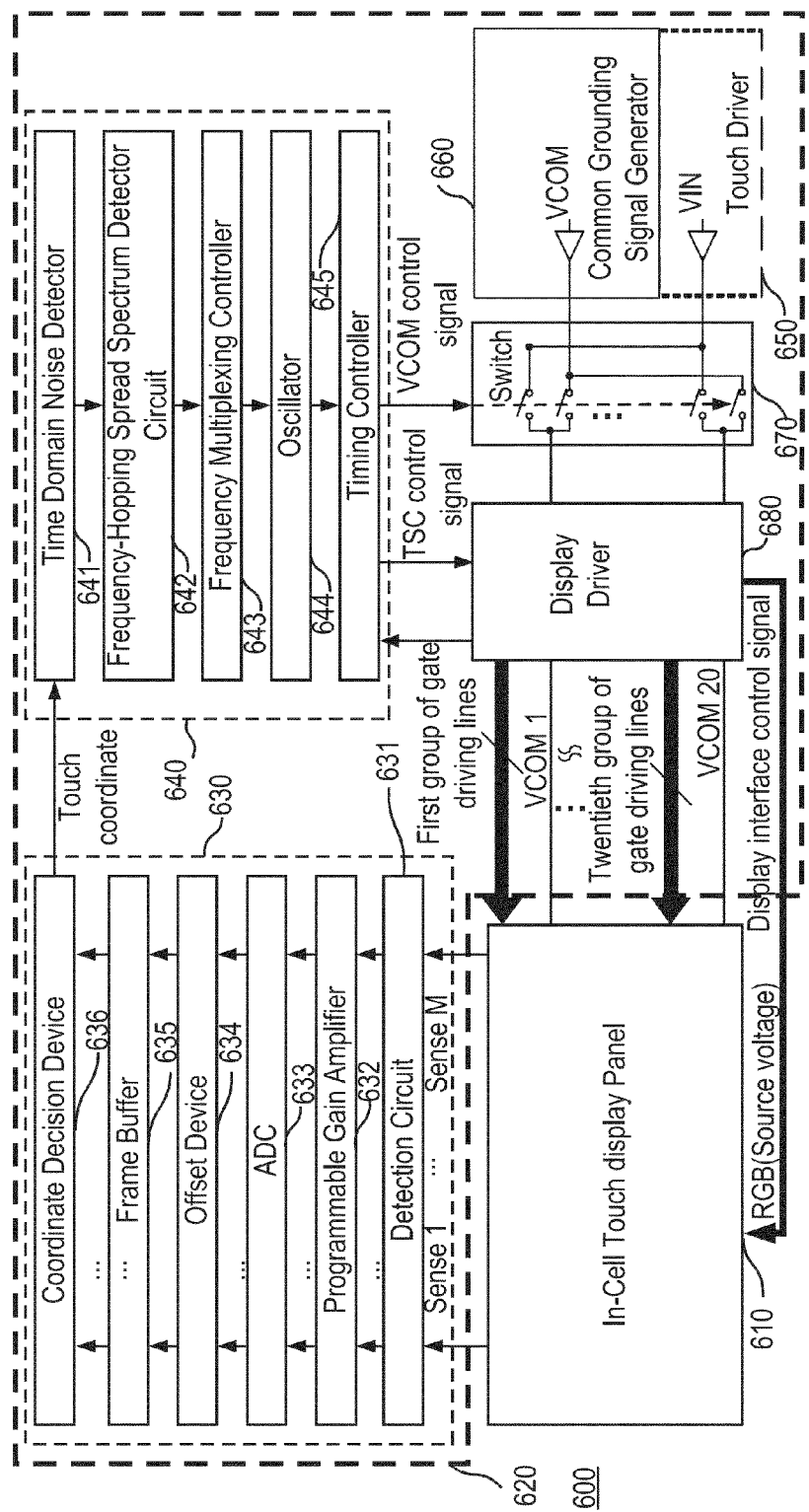
FIG. 6 is block diagram of an in-cell multi-touch panel system with low noise and time-division multiplexing according to the invention.

FIG. 6 is block diagram of an in-cell multi-touch panel system 600 with low noise and time-division multiplexing according to the invention. In FIG. 6, the in-cell multi-touch panel system 600 includes an in-cell touch display panel 610 and a touch display control system 620.

The in-cell touch display panel 610 displays an image signal and senses an external object.

The touch display control system 620 is connected to the in-cell touch display panel 610. The touch display control system 620 sequentially outputs a display driving signal to the in-cell touch display panel 610 for displaying the image signal. In addition, the touch display control system 620 sequentially outputs a touch driving signal to the in-cell touch display panel for sampling a sensing voltage from the in-cell touch display panel 610 and determining whether an external object approaches to the in-cell touch display panel. In a first frame time interval, the touch display control system 620 drives the in-cell touch display panel 610 and samples the sensing voltage from the in-cell touch display panel 610 in order to determine whether there is an approaching external object and whether there is noise interference. If there is noise interference, in a second frame time interval, the touch display control system 620 changes the frequency of the touch driving signal, so as to find out the frequency of a touch driving signal with minimum noise. In a third frame time interval, the touch display control system 620 is based on the frequency of the touch driving signal with minimum noise to correspondingly generate a desired touch driving signal for determining whether an external object approaches to the in-cell touch display panel 610.

Figure 1:
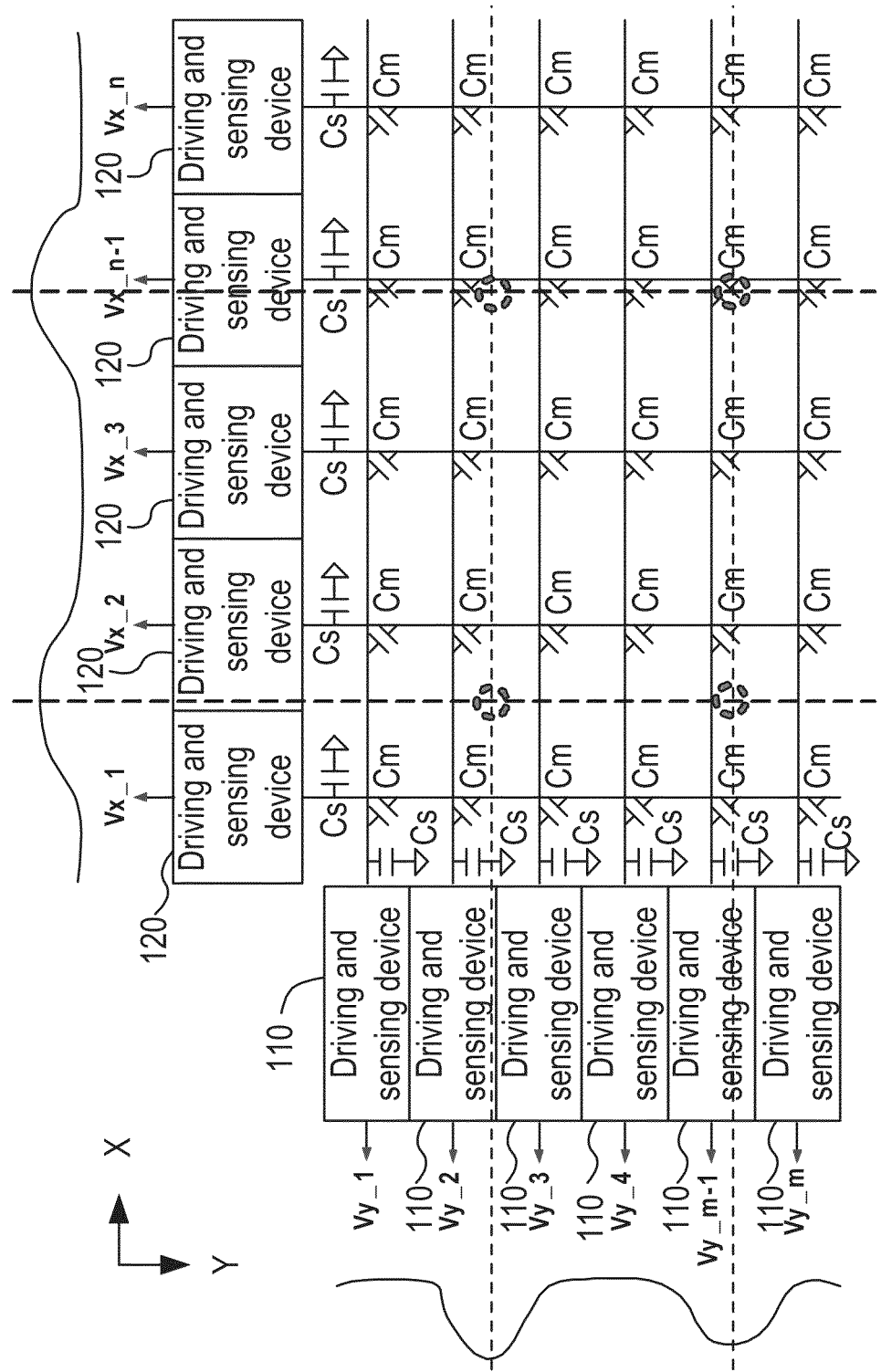
FIG. 1 is a schematic view of a typical self capacitance sensing.
Figure 2:
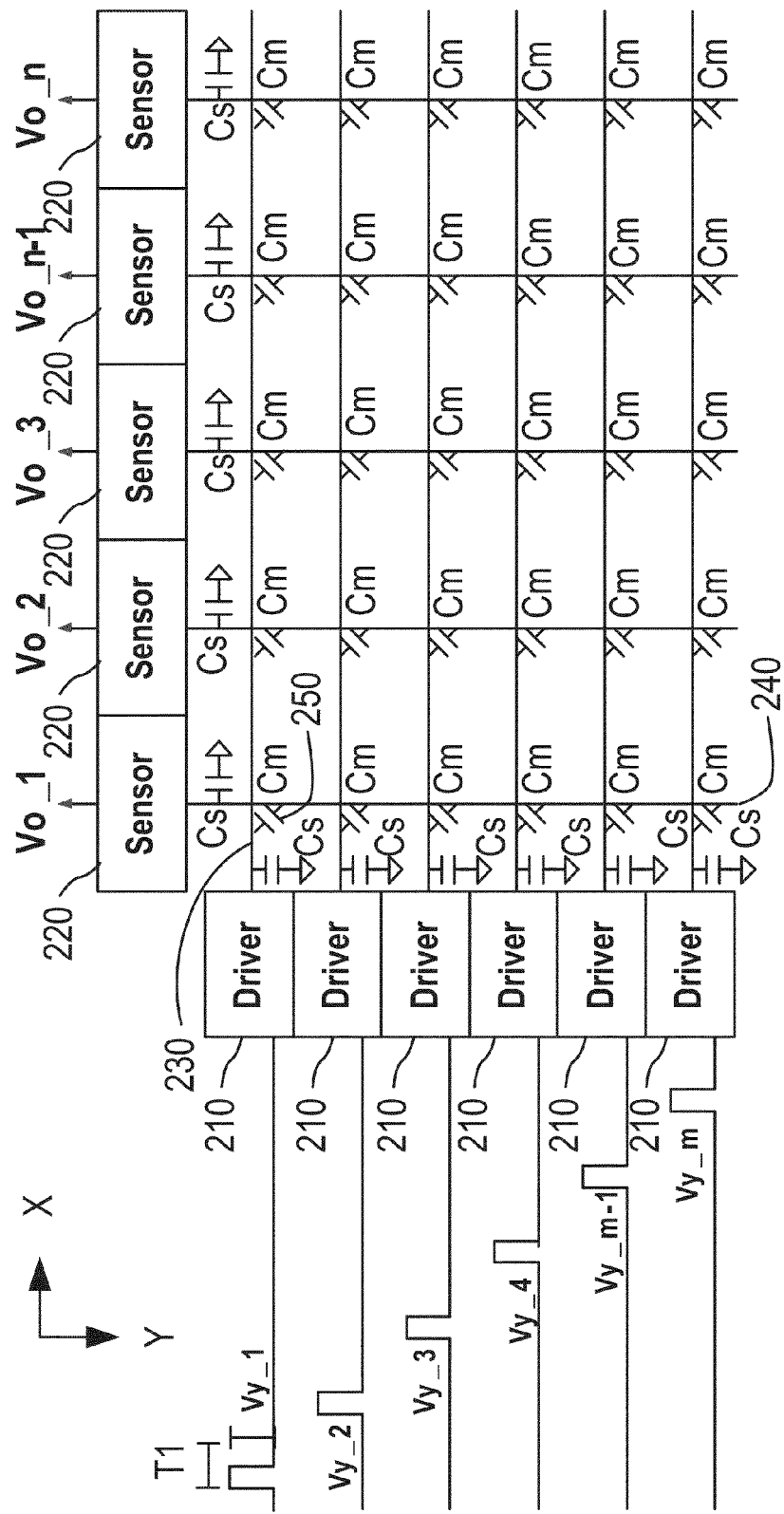
FIG. 2 is a schematic view of a typical mutual capacitance sensing.
Figure 3:
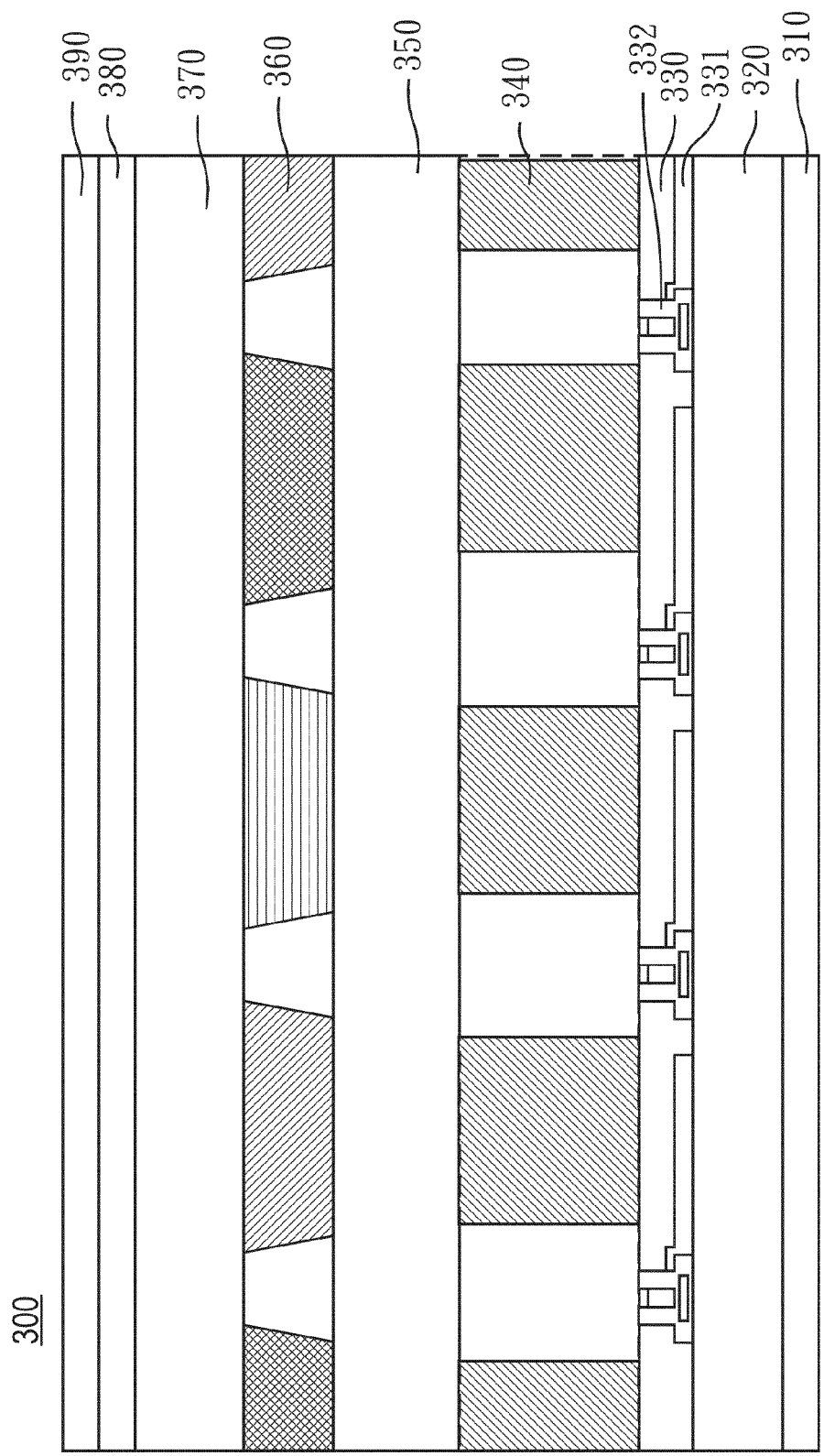
FIG. 3 is a schematic view of a configuration of a typical in-cell multi-touch panel.
Figure 4:
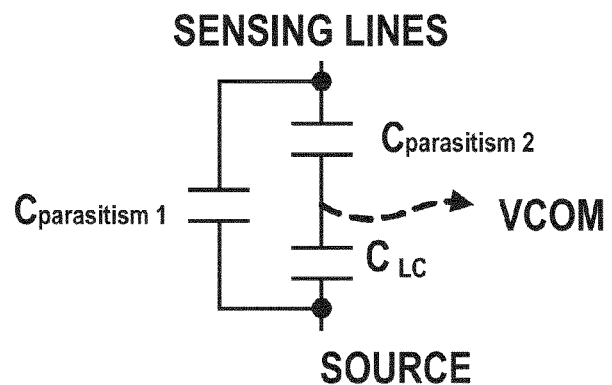
FIG. 4 is a schematic view of a capacitance of a typical in-cell touch display panel.
Figure 5A:
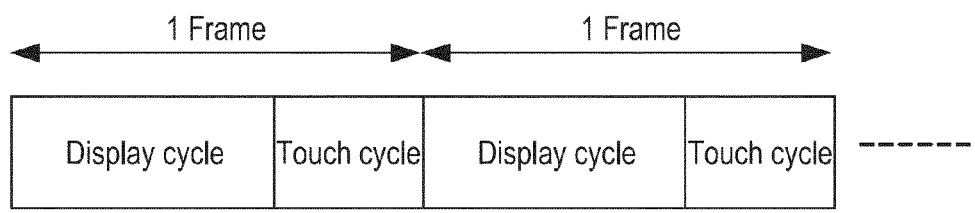
FIGS. 5(A) and 5(B) are timings of typical time sharing.
Figure 5B:
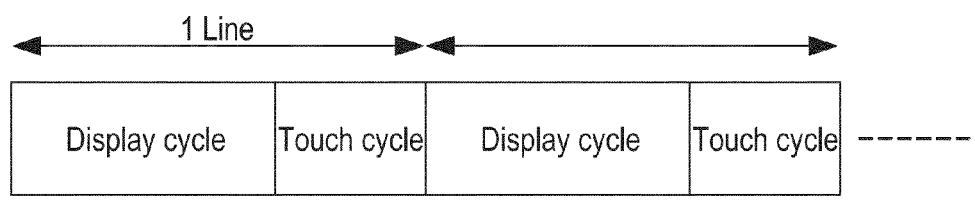
Figure 7:
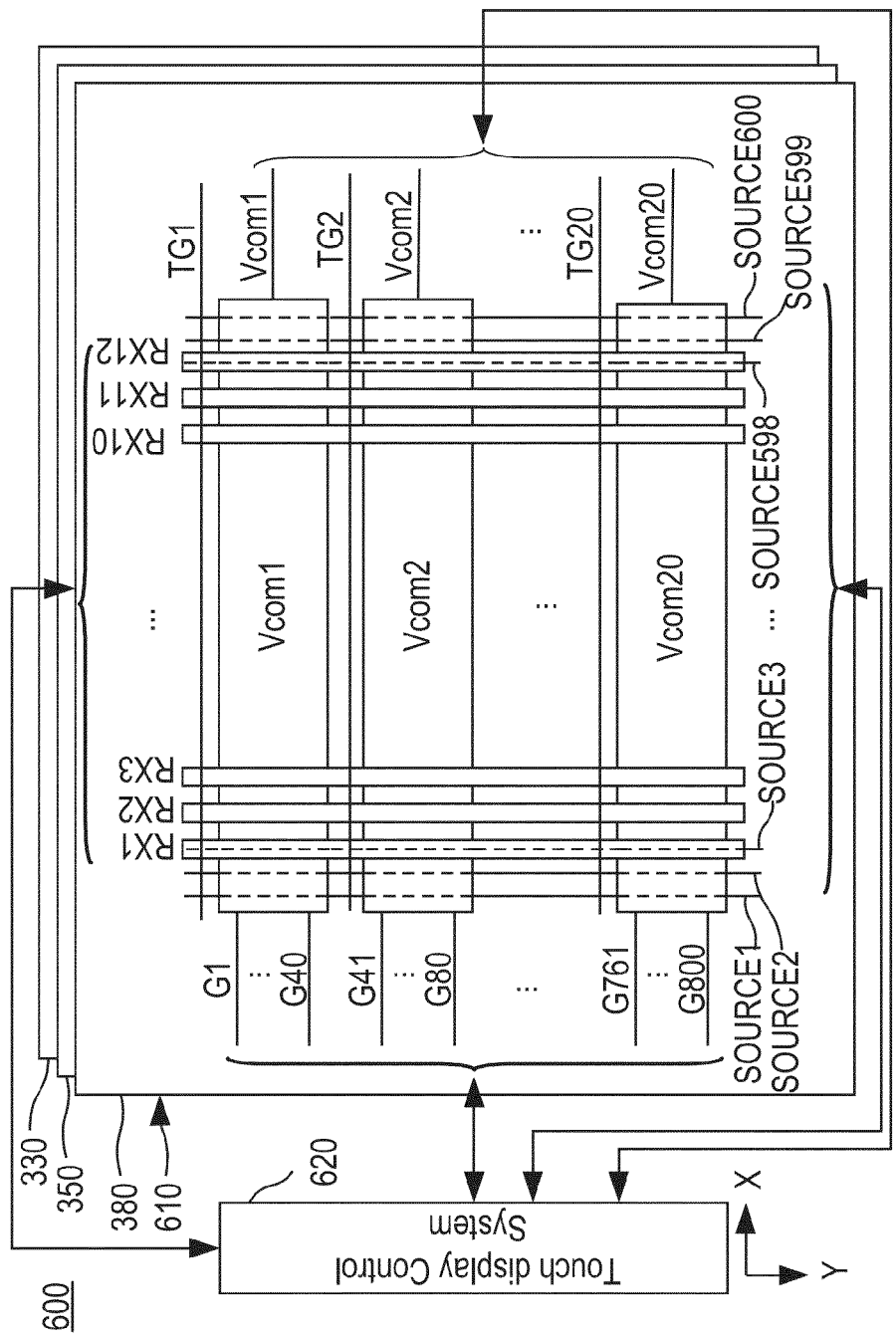
FIG. 7 is a schematic diagram of an in-cell touch display panel according to the invention.

FIG. 7 is a schematic diagram of the in-cell touch display panel 610 according to the invention. In FIG. 7, the in-cell touch display panel 610 includes a thin film transistor (TFT) layer 330, a sensing electrode layer 380, and a common voltage and touch driving layer 350. The stack of the layers 330, 350, and 380 of the panel 610 can be arranged as shown in FIG. 3.

The TFT layer 330 has k gate driving lines G1, G2, . . . , GK and L source driving lines SOURCE1, SOURCE2, . . . , SOURCEL to drive the corresponding transistors and capacitors of the pixels of the panel 610 based on a display pixel signal and the display driving signal for performing a display operation, where K and L are each a positive integer. For convenient description, K is equal to 800 and L is equal to 600 in this embodiment.

The active component of the TFT layer 330 is a TFT in this embodiment; however, in other embodiments, it can be a low temperature poly-silicon TFT (LTPS TFT), indium gallium zinc oxide TFT (IGZO TFT), or continuous grain silicon (CGS).

The sensing electrode layer 380 has M first conductor lines RX1, RX2, . . . , RXM and senses an approaching external object based on the touch driving signal, where M is a positive integer. In this embodiment, M is equal to 12.

The common voltage and touch driving layer (Vcom) 350 has N second conductor lines Vcom1, Vcom2, . . . , VcomN to receive a common voltage Vcom on displaying, and to receive the touch driving signal on touch sensing, where N is a positive integer and K is a positive integer greater than N. In this embodiment, N is equal to 20.

The M first conductor lines RX1, RX2, . . . , RXM and the L source driving lines SOURCE1, SOURCE2, . . . , SOURCEL are located on a first direction (Y-axis direction). The K gate driving lines G1, G2, . . . , GK and the N second conductor lines Vcom1, Vcom2, . . . , VcomN are located on a second direction (X-axis direction). The first direction is substantially vertical to the second direction.

In this embodiment, the K gate driving lines G1, G2, . . . , GK are arranged corresponding to the N second conductor lines Vcom1, Vcom2, . . . , VcomN. That is, the gate driving lines G1-G40 correspond to the second conductor line Vcom1, the gate driving lines G41-G80 correspond to the second conductor line Vcom2, and so on. Moreover, the gate driving lines G1-G40 are defined as a first group, the gate driving lines G41-G80 are defined as a second group, . . . , the gate driving lines G761-G800 are defined as a twentieth group. More specifically, the first group of gate driving lines G1-G40 in the TFT layer 330 is located at a same position as the corresponding second conductor line Vcom1 is located in the common voltage and touch driving layer (Vcom) 350, while similar arrangements are applied to the other groups and second conductor lines.

When K is not an integral multiple of N, for example K=802 and N=20, the gate driving lines G1-G41 correspond to the second conductor line Vcom1, the gate driving lines G42-G82 correspond to the second conductor line Vcom2, the gate driving lines G83-G122 correspond to the second conductor line Vcom3, and so on.

The touch display control system 620 is connected to the TFT layer 330, the sensing electrode layer 380, and the common voltage and touch driving layer 350. The touch display control system 620 sequentially provides the display driving signal to the K (800) gate driving lines to turn on corresponding transistors, and provides the display pixel signal to the L (600) source driving lines to charge the capacitors of the pixels through the corresponding transistors for performing a display operation. The touch display control system 620 sequentially outputs the touch driving signal to the N second conductor lines Vcom1-Vcom20, and samples a sensing voltage from the M first conductor lines RX1-RX12 to thereby determine whether an external object approaches to the panel 610.

The K (800) gate driving lines are divided into N (20) groups, each corresponding to one second conductor line. When one of the groups of gate driving lines receives the display driving signal, the second conductor line corresponding to the group of gate driving lines is connected to the common voltage Vcom for use as a ground on displaying.

As shown in FIG. 6, the touch display control system 620 includes a touch detector 630, a noise and timing controller 640, a touch driver 650, a common grounding signal generator 660, a switch 670, and a display driver 680.

The touch detector 630 is connected to the common voltage and touch driving layer 350 of the in-cell touch display panel 610 in order to detect the mutual capacitance of the panel 610 and further generate the touch coordinate of a touch point.

The noise and timing controller 640 is connected to the touch detector 630 in order to detect whether there is a noise interference based on the touch coordinate. When there is noise interference, the frequency of the touch driving signal is changed, so as to generate and output the display driving signal and a switch signal.

The touch driver 650 is provided to generate the touch driving signal VIN.

The common grounding signal generator 660 is based on the display driving signal to generate a common grounding signal VCOM.

The switch 670 is connected to the noise and timing controller 640, the touch driver 650, the common grounding signal generator 660, and the in-cell touch display panel 610 in order to output the touch driving signal or the common grounding signal to the in-cell touch display panel 610 based on the switch signal.

The display driver 680 is connected to the noise and timing controller 640 in order to output the display driving signal to the in-cell touch display panel 610.

The touch detector 630 includes a detection circuit 631, a programmable gain amplifier 632, an analog to digital converter 633, an offset device 634, a frame buffer 635, and a coordinate decision device 636.

Since the sensing electrode layer 380 has the M first conductor lines RX1, RX2, . . . , RXM, the detection circuit 631 also has M sensors to detect the mutual capacitance and further generate corresponding M sensing signals.

The programmable gain amplifier 632 is connected to the detection circuit 631 in order to amplify the M sensing signals and further generate M amplified signals.

The analog to digital converter (ADC) 633 is connected to the programmable gain amplifier 632 in order to convert the M amplified signals into M digital signals for N times, so as to generate N×M digital signals.

The offset device 634 is connected to the ADC 633 in order to perform an offset adjustment on the N×M digital signals to thereby generate N×M offset signals.

The frame buffer 635 is connected to the offset device 634 in order to buffer the N×M offset signals outputted by the offset device 634.

The coordinate decision device 636 is connected to the frame buffer 635 in order to determine the touch coordinate on the in-cell touch display panel touched by an external object, such as a grounded conductor or a finger.

The noise and timing controller 640 includes a time domain noise detector 641, a frequency-hopping spread spectrum detector circuit 642, a frequency multiplexing controller 643, an oscillator 644, and a timing controller 645.

The time domain noise detector 641 is connected to the coordinate decision device 636 in order to detect whether there is noise interference based on the touch coordinate and generate an indicative signal when there is noise interference.

The frequency-hopping spread spectrum detector circuit 642 is connected to the time domain noise detector 641 in order to perform a frequency hopping based on the indicative signal to thereby generate a frequency hopping indicative signal representative of the frequency hopping.

The frequency multiplexing controller 643 is connected to the frequency-hopping spread spectrum detector circuit 642 in order to search a set of possible frequencies based on the frequency hopping indicative signal and find a cleanest driving frequency for output.

The oscillator 644 is connected to the frequency multiplexing controller 643 in order to generate an oscillation signal based on the cleanest driving frequency outputted by the frequency multiplexing controller 643.

The timing controller 645 is connected to the oscillator 644 in order to generate the display driving signal and the switch signal based on the oscillation signal.

Figure 8:
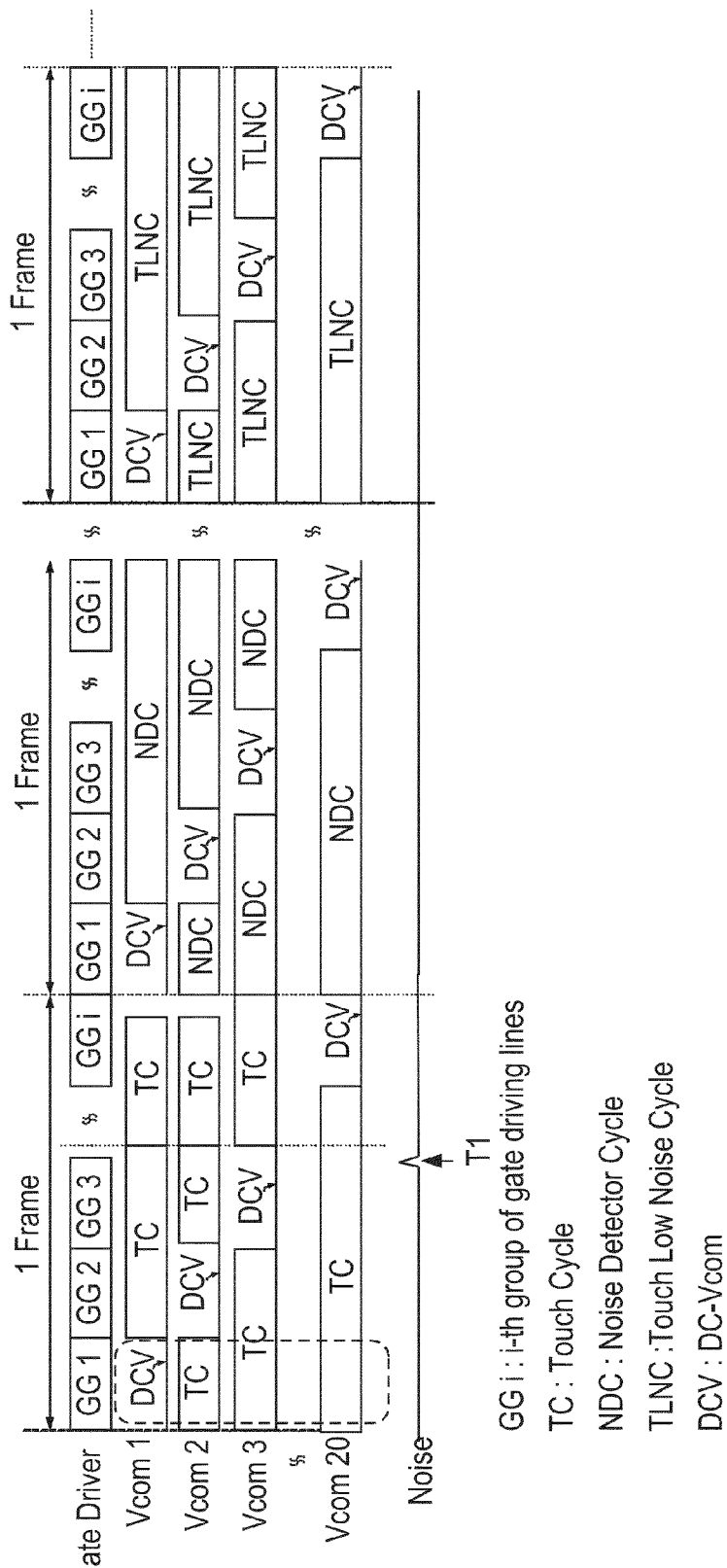
FIG. 8 is a timing of concurrently performing display and touch sensing by a touch display control system according to an embodiment of the invention.

FIG. 8 is a timing for concurrently performing display and touch sensing by the touch display control system 620 according to an embodiment of the invention. The operation principle of the touch display control system 620 can be of inter-frame scheme or intra-frame scheme.

The inter-frame scheme is described as follows:

As shown in FIG. 8, in a first frame time interval, the touch display control system 620 drives the in-cell touch display panel 610 and samples a sensing voltage from the in-cell touch display panel to determine whether an external object approaches to the in-cell touch display panel 610 and whether there is noise interference. As shown in FIG. 8, at time T1, there is noise generated. That is, when there is noise interference, in a second frame time interval, the touch display control system 620 changes the frequency of the touch driving signal to thus find out the frequency of a touch driving signal with minimum noise. In the third frame time interval, the touch display control system 620 is based on the frequency of the touch driving signal with minimum noise to generate a desired touch driving signal for determining whether an external object approaches to the in-cell touch display panel 610.

The intra-frame scheme is described as follows:

When the touch display control system 620 provides the touch driving signal to the i-th second conductor line, the touch display control system 620 first determines whether the display driving signal is concurrently provided to the i-th group of gate driving lines. If not, the touch display control system 620 provides the touch driving signal to the i-th second conductor line. Thus, both display and touch sensing can be concurrently operated.

As show in FIG. 8, when the first group of gate driving lines G1-G40 is performed with a display on an LCD panel, the switch 670 outputs the common grounding signal to the second conductor line Vcom1 corresponding to the gate driving lines G1-G40. Meanwhile, the second to twentieth groups are not performed with a display operation, while the switch 670 outputs the touch driving signal to the second conductor lines Vcom2-Vcom20 corresponding to the second to twentieth groups respectively.

Figure 9:
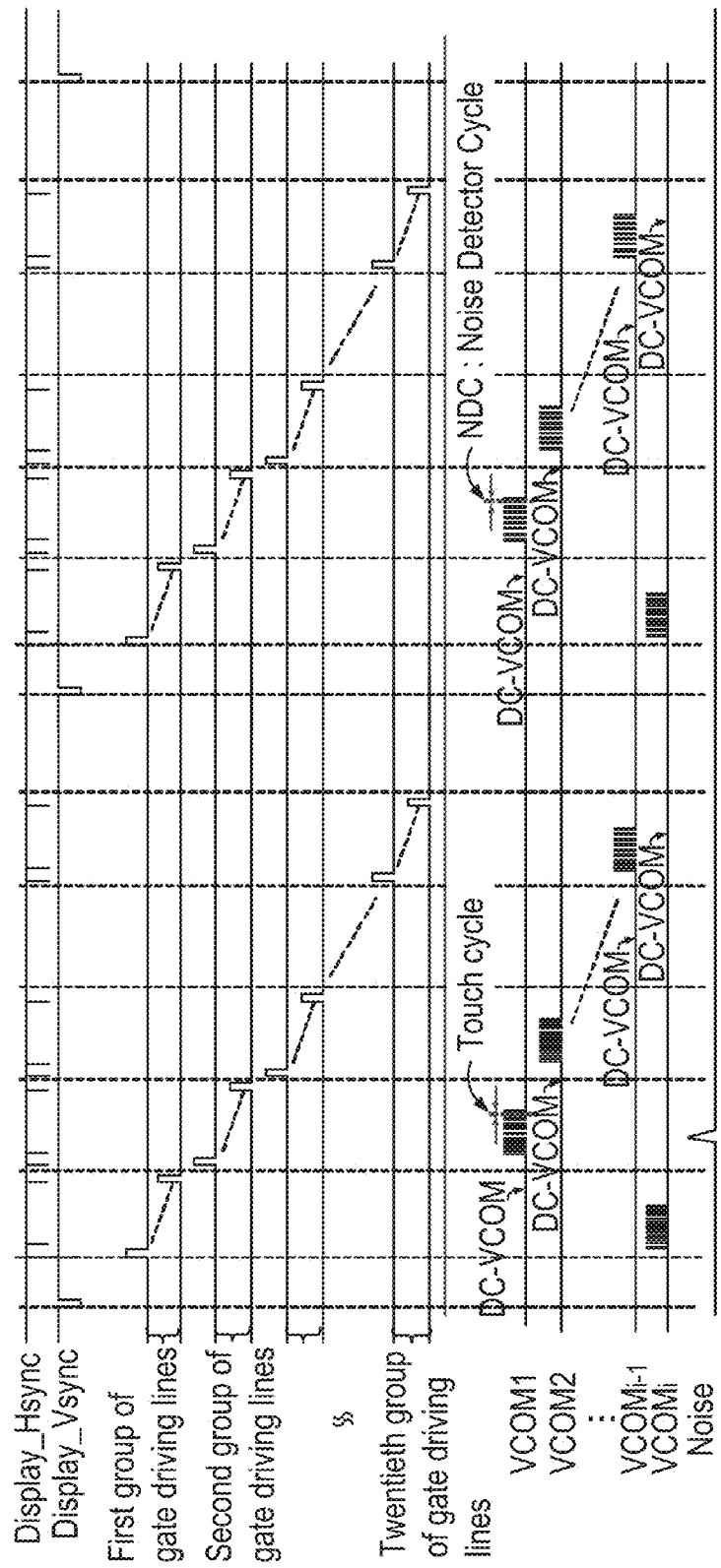
FIG. 9 is a detailed timing of concurrently performing display and touch sensing by a touch display control system according to an embodiment of the invention.

FIG. 9 is a detailed timing of concurrently performing display and touch sensing by the touch display control system 620 according to an embodiment of the invention. When the touch display control system 620 provides the display driving signal to the i-th group of gate driving lines, it also provides the touch driving signal to the (i–1)-th second conductor line, where i=2 to N. When the touch display control system 620 provides the display driving signal to the first group of gate driving lines, it also provides the common voltage to the N-th second conductor line to thereby connect the N-th second conductor line to the common voltage.

It is known from FIGS. 8 and 9 that the invention divides the N second conductor lines into two cycles: touch cycle and display cycle.

Initially, the first group of gate driving lines G1-G40 sequentially outputs a voltage required for the TFTs of the LCD panel, and the display driver 680 writes the data from SOURCE1-SOURCE600 into the liquid crystal equivalent capacitance to thereby control the orientation of the liquid crystal molecules so as to present a frame with different gray scales.

In this case, the voltage of the second conductor line Vcom1 corresponding to the first group of gate driving lines G1-G40 is a direct current common voltage DC-VCOM, while the other second conductor lines Vcom2, Vcom3, . . . , Vcom20 can generate the touch driving signal VIN in sequential or multiplexing manner via the touch cycle.

The touch driving signal VIN can be a square wave, sine wave, triangle wave, or the like. The touch driving signal VIN can be a voltage level of the power source or any voltage level for respectively driving different N second conductor lines (Vcom1, Vcom2, . . . , VcomN), such that the mutual capacitance between the N second conductor lines (Vcom1, Vcom2, . . . , VcomN) and the M first conductor lines (RX1, RX2, . . . , RX12) can be used to collect the accumulated charge by the M first conductor lines (RX1, RX2, . . . , RX12), so as to perform a signal amplification on the accumulated charge by the programmable gain amplifier 632. Because the charge accumulated by the detection circuit 631 is not related to the polarity switch and display frame on a display of the panel, the display of the panel is normal without being affected by such a touch operation. Accordingly, the feature of concurrently operating display and touch sensing is achieved, and the entire working time is reduced to further generate stable touch data.

Similarly, when the second group of gate driving lines G41-G80 sequentially outputs a voltage required for the TFTs of the LCD panel, the voltage of the second conductor line Vcom2 corresponding to the first group of gate driving lines G1-G40 is the voltage DC-VCOM. The other second conductor lines Vcom1, Vcom3, . . . , Vcom20 can generate the touch driving signal VIN in a sequential or multiplexing manner through the touch cycle, so as to allow the detection circuit 631 to collect and accumulate different charge on each mutual capacitance, thereby determining whether there is an approaching object.

Then, if there is a noise occurred, the time domain noise detector 641 detects a serious jitter on the voltage of the M first conductor lines (RX1, RX2, . . . , RX12). In this case, the frequency-hopping spread spectrum detector circuit 642 detects whether to perform a frequency hopping operation, i.e., accesses a raw data and performs a statistical comparison to determine whether there is noise interference, so as to activate the frequency hopping mechanism when there is noise interference. When the frequency hopping mechanism is activated, the frequency multiplexing controller 643 enters in the noise detector cycle to find the cleanest driving frequency. When the cleanest driving frequency is found by the statistical comparison, the frequency multiplexing controller 643 notifies the oscillator 644 and the timing controller 645 to be adjusted to the cleanest driving frequency (touch low noise cycle). The timing controller 645 is based on this cleanest driving frequency to drive the touch panel so as to avoid the analog or digital filters from being unable to filter out the noises and thus overcome the problem of erroneous and unstable touch point determination due to the signal jitter, t thereby increasing the linearity, reliability, and SNR of a touch coordinate.

As shown in FIG. 9, when the Display_Vsync signal is received, the first group of gate driving lines G1-G40, which corresponds to a position where the second conductor line Vcom1 is located in the common voltage and touch driving layer 350, is sequentially activated, while the second conductor line Vcom1 is not activated. The second conductor line Vcom2 starts to receive the touch driving signal VIN, and the detection circuit 631 starts to detect the touch data in the Vcom2 area.

Next, after the first group of gate driving lines G1-G40 is completely operated and the operation goes to the second group of gate driving lines G41-80, the second conductor line Vcom1 starts to receive the touch driving signal VIN, and the detection circuit 631 starts to detect the touch data in the Vcom1 area. Next, after the second group of gate driving lines G41-G80 is completely operated and the operation goes to the third group G81-120, the second conductor line Vcom2 starts to receive the touch driving signal VIN, and the detection circuit 631 starts to detect the touch data in the Vcom2 area.

As shown in FIG. 9, the display and touch data in every area of the second conductor lines Vcom1-Vcom20 is sequentially complete, wherein there is no need for the display timing to do time sharing or to shorten its driving time.

When there is noise occurred, a next frame time interval starts, the second conductor lines Vcom1-Vcom20 starts to detect or perform a frequency hopping operation, i.e., to enter in a noise detector cycle, for obtaining a cleanest driving frequency (touch low noise cycle), so as to further increase the linearity of the touch coordinate.

Figure 10:
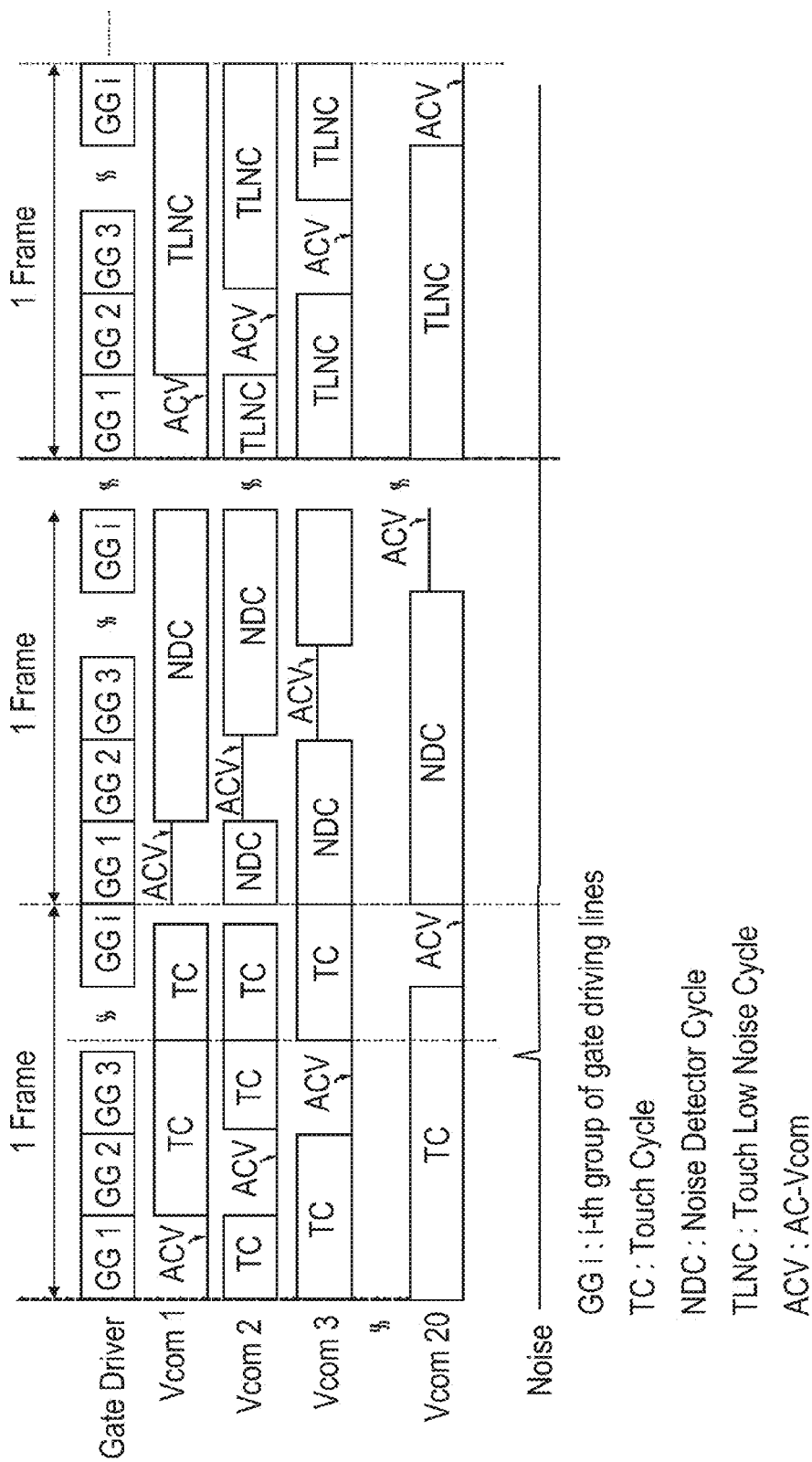
FIG. 10 is a timing of an AC-VCOM reference according to the invention.

For such a panel driving process, an alternate current common voltage AC-VCOM can be used in addition to the direct current common voltage DC-VCOM. FIG. 10 shows a timing reference of an AC-VCOM according to the invention. As shown in FIG. 10, when the voltage of VCOM is VCOMH, the output high level of the touch driving signal VIN is voltage of VCOMH and the output low level thereof is GND or a voltage lower than VCOMH.

Figure 11:
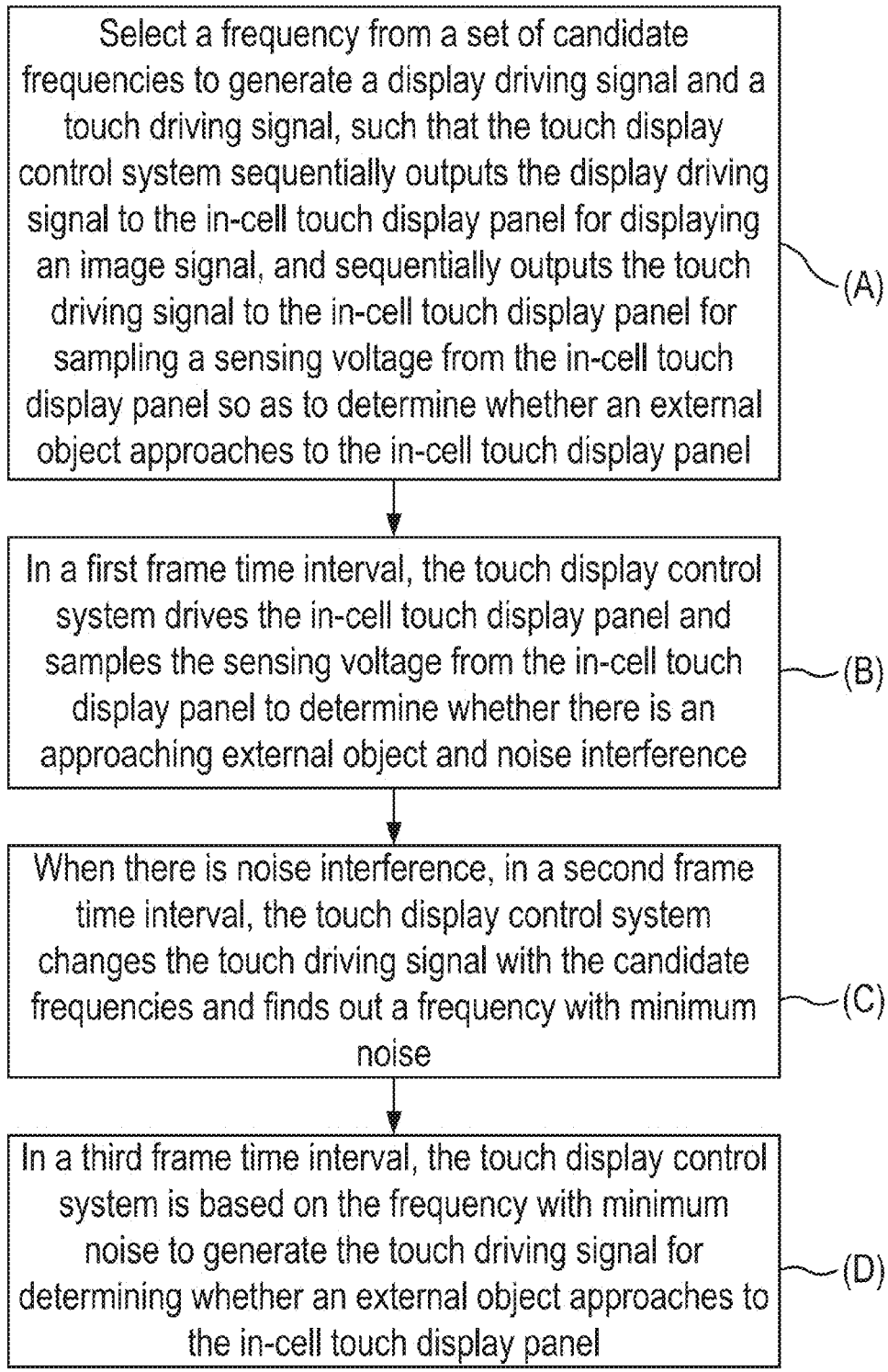
FIG. 11 is a flowchart of a driving method for an in-cell multi-touch panel system with low noise and time-division multiplexing according to the invention.

FIG. 11 is a flowchart of a driving method for an in-cell multi-touch panel system with low noise and time-division multiplexing according to the invention. In FIG. 11, the in-cell multi-touch panel system includes an in-cell touch display panel and a touch display control system, as described previously.

First, step (A) selects a frequency from a set of possible frequencies in order to generate a display driving signal and a touch driving signal, such that the touch display control system 620 sequentially outputs the display driving signal to the in-cell touch display panel 610 for displaying an image signal, and sequentially outputs the touch driving signal to the in-cell touch display panel 610 for sampling a sensing voltage from the in-cell touch display panel 610 and accordingly determining whether an external object approaches to the in-cell touch display panel 610. The touch display control system in the initialization of step (A) reads two-dimensional touch data of the in-cell touch display panel 610 as two-dimensional touch reference data.

In step (B), in a first frame time interval, the touch display control system drives the in-cell touch display panel and samples the sensing voltage from the in-cell touch display panel to thereby determine whether there is an approaching external object or noise interference.

Figure 12:
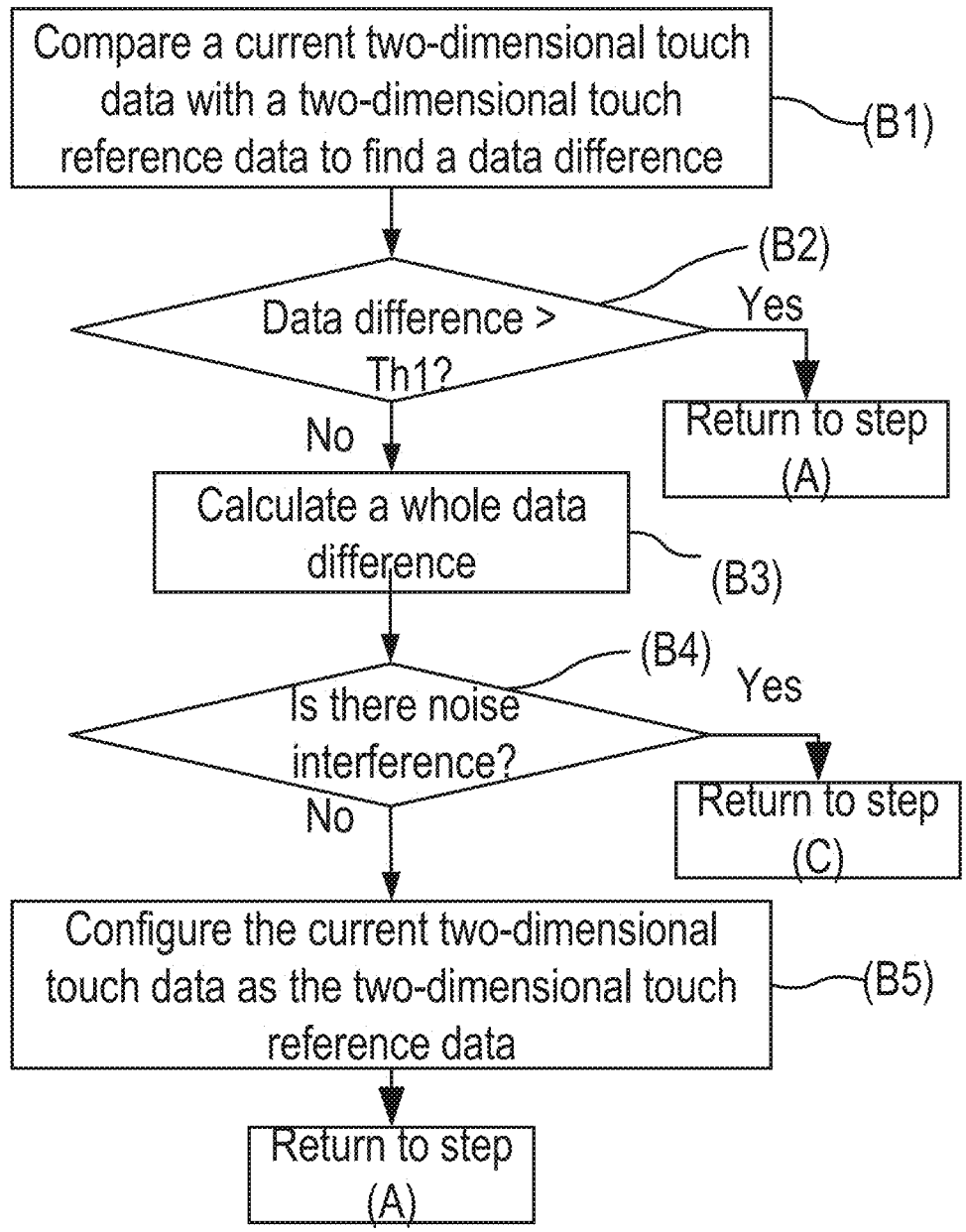
FIG. 12 is a detail of step (B) according to the invention.

FIG. 12 is a detail of the step (B) according to the invention. Step (B1) compares a current two-dimensional touch data with a two-dimensional touch reference data at a corresponding position to find a data difference for detecting whether there is an approaching external object or noise interference.

Step (B2) determines whether the data difference is over a first threshold Th1. When an external object approaches to the in-cell touch display panel 610, the voltage difference detected by the detection circuit 631 between there being an approaching object and there being no approaching object is about 100 mV or more than 100 mV. Namely, the touch display control system 620 calculates the data difference between one data of the current two-dimensional touch data and the corresponding one of two-dimensional touch reference data. When the data difference is over the first threshold Th1, it indicates a touch and the process returns to step (A). When the data difference is not over the first threshold Th1, it indicates no touch.

In step (B3), when the data difference is not over the first threshold Th1, the touch display control system 620 calculates a whole data difference between all data of the current two-dimensional touch data and the corresponding data of the two-dimensional touch reference data. Namely, when the difference between each data of the current two-dimensional touch data and the corresponding data of the two-dimensional touch reference data is not over the first threshold, it indicates that no external object approaches to the in-cell touch display panel 610, whereby the whole data difference is calculated.

Step (B4) is based on the whole data difference to determine whether there is noise interference. When noise interference exists on the in-cell touch display panel 610, the detection circuit 631 detects a serious jitter on the voltage and has a voltage difference smaller than 100 mV in comparison with no approaching external object. In this case, when the whole data difference is greater than a second threshold Th2 and smaller than a third threshold Th3, it indicates that the noise interference exists on the in-cell touch display panel 610, and then step (C) is executed.

In step (B5), when it is determined that there is no noise interference, the current two-dimensional touch data is configured. When the whole data difference is smaller than or equal to the second threshold Th2, it indicates that there is no noise interference on the in-cell touch display panel 610, such that the current two-dimensional touch data is configured as the two-dimensional touch reference data for use in next determination, and the process returns to step (A).

In step (C), when there is noise interference, in a second frame time interval, the touch display control system changes the touch driving signal with the possible frequencies and finds out a frequency with minimum noise as the frequency of the touch driving signal.

Figure 13:
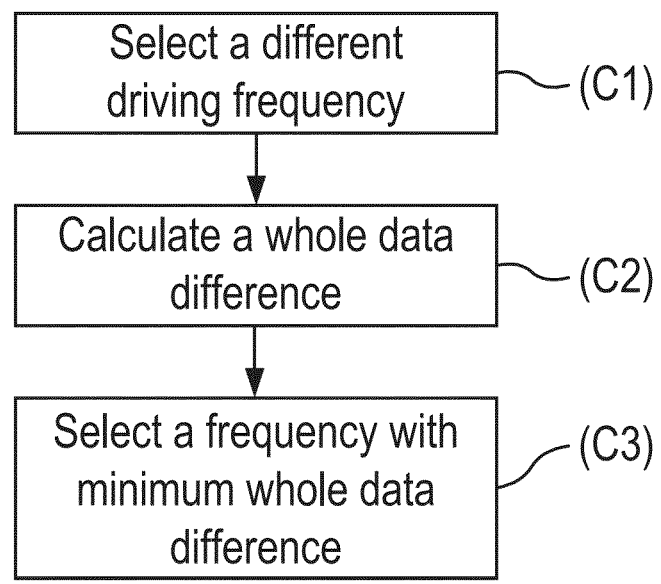
FIG. 13 is a detail of step (C) according to the invention.

FIG. 13 is a detail of step (C) according to the invention. Step (C1) selects a different driving frequency from a set of candidate frequencies. When there is noise interference, the touch display control system 620 selects the different driving frequency from the set of candidate frequencies to accordingly generate the touch driving signal for driving the in-cell touch display panel 610.

Step (C2) reads the two-dimensional touch data of the in-cell touch display panel 610 to thereby calculate the whole data difference with respect to the corresponding data of the two-dimensional touch reference data.

Step (C3) selects a frequency with a minimum whole data difference. Every driving frequency has a respective whole data difference. The frequency with the minimum whole data difference is a frequency with minimum noise so as to have the lowest noise affection.

In step (D), in a third frame time interval, the touch display control system is based on the frequency with minimum noise to generate the touch driving signal to thereby determine whether an external object approaches to the in-cell touch display panel.

As cited, the prior art operates display and touch sensing in time sharing. However, the present invention improves the current configuration to allow the common grounding signal VCOM on displaying and the touch driving signal (VIN) on touching to share the same layer of transparent electrical conductor thereby saving the cost, and to use different driving timings for concurrently driving a display and a touch control, thereby solving the problem of insufficient time for the display and touch control in the prior art.

In addition, when serious noise is detected, the noise and timing controller 640 can send a set of signals to perform a frequency hopping operation to thereby avoid the ADC from being unable to filter out the noise, so as to further reduce the affection to the touch detector due to noises generated by the common voltage layer (Vcom), the source of the TFTs on the LCD panel, and the polarity inversion on the LCD panel, thus increasing the linearity and reliability of coordinate determination of touch points to further raise the system SNR.

Although the present invention has been explained in relation to its preferred embodiment, it is to be understood that many other possible modifications and variations can be made without departing from the spirit and scope of the invention as hereinafter claimed.

What is claimed is:

1. An in-cell multi-touch panel system with low noise and time division multiplexing, comprising:
   an in-cell touch display panel, for displaying an image signal and sensing an external object, wherein the in-cell touch display panel includes a common voltage and touch driving layer, which has N second conductor lines to receive a common voltage in displaying period and a touch driving signal in touch sensing period; and
   a touch display control system connected to the in-cell touch display panel, for sequentially outputting a display driving signal to the in-cell touch display panel so as to display the image signal, and for sequentially outputting the touch driving signal to the in-cell touch display panel for sampling a sensing voltage from the in-cell touch display panel so as to determine whether there is the external object,
   wherein, the touch display control system drives the in-cell touch display panel and samples the sensing voltage from the in-cell touch display panel to determine whether there is the external object and noise interference during a first frame time interval, the touch display control system finds out a frequency with the minimum noise for use as a frequency of the touch driving signal when the noise interference exists during a second frame time interval, and the touch display control system is based on the frequency with minimum noise to correspondingly generate the touch driving signal so as to determine whether there is the external object during a third frame time interval.

2. The panel system as claimed in claim 1, wherein the in-cell touch display panel comprises:
   a thin film transistor (TFT) layer, having K gate driving lines and L source driving lines, to drive corresponding transistors and capacitors based on a display pixel signal and the display driving signal thereby performing a display operation; and
   a sensing electrode layer, which has M first conductor lines to sense an approaching external object based on the touch driving signal;
   wherein the M first conductor lines and the L second source driving lines are disposed on a first direction, the K gate driving lines and the N second conductor lines are disposed on a second direction, a mutual capacitance is formed on each overlap between the first conductor lines and the second conductor lines, and the first direction is vertical to the second direction, where K, L, M and N are positive integer respectively and K is a value greater than N.

3. The panel system as claimed in claim 2, wherein the touch display control system is connected to the TFT layer, the sensing electrode layer, and the common voltage and touch driving layer, for sequentially providing the display driving signal to the K gate driving lines to turn on corresponding transistors and sequentially providing the display pixel signal to the L source driving lines to perform the display operation, and the touch display control system sequentially provides the touch driving signal to the N second conductor lines and samples a sensing voltage from the M first conductor lines, for determining whether there is the external object.

4. The panel system as claimed in claim 3, wherein the K gate driving lines are divided into N groups, each corresponding to one second conductor line such that the second conductor line is connected to the common voltage when the group receives the display driving signal, and the touch display control system first determines whether the display driving signal is concurrently provided to an i-th group of gate driving lines and then provides the touch driving signal to an i-th second conductor line corresponding to the i-th group of gate driving lines when the display driving signal is not concurrently provided, where i=1 to N.

5. The panel system as claimed in claim 4, wherein the touch display control system provides the touch driving signal to a (j−1)-th second conductor line when the touch display control system provides the display driving signal to a j-th group of gate driving lines, where j=2 to N.

6. The panel system as claimed in claim 2, wherein the touch display control system provides the common voltage to an N-th second conductor line to thus connect the N-th second conductor line to the common voltage when the touch display control system provides the display driving signal to the first group of gate driving lines.

7. The panel system as claimed in claim 2, wherein the touch display control system comprises:
   a touch detector, connected to the common voltage and touch driving layer of the in-cell touch display panel, for detecting the mutual capacitance of the in-cell touch display panel and correspondingly generate a touch coordinate; and
   a noise and timing controller, connected to the touch detector, in order to detect a noise interference based on the touch coordinate and change the frequency of the touch driving signal to correspondingly generate the display driving signal and a switch signal when the noise interference exists.

8. The panel system as claimed in claim 7, wherein the touch display control system further comprises:
   a touch driver, for generating the touch driving signal;
   a common grounding signal generator, for generating a common grounding signal based on the display driving signal;
   a switch, connected to the noise and timing controller, the touch driver, the common grounding signal generator, and the in-cell touch display panel, for outputting the touch driving signal or the common grounding signal to the in-cell touch display panel based on the switch signal; and
   a display driver, connected to the noise and timing controller for outputting the display driving signal to the in-cell touch display panel.

9. The panel system as claimed in claim 7, wherein the touch detector comprises:
   a detection circuit, having M sensors to detect the mutual capacitance and further generate corresponding M sensing signals;
   a programmable gain amplifier, connected to the detection circuit, for amplifying the M sensing signals and further generating M amplified signals;
   a analog to digital converter (ADC), connected to the programmable gain amplifier, for converting the M amplified signals into M digital signals for N times so as to generate N×M digital signals;
   an offset device, connected to the ADC for performing an offset adjustment on the N×M digital signals to generate N×M offset signals;
   a frame buffer, connected to the offset device, for buffering the N×M offset signals outputted by the offset device; and
   a coordinate decision device, connected to the frame buffer, for determining the touch coordinate on the in-cell touch display panel touched by a grounded conductor or a finger.

10. The panel system as claimed in claim 7, wherein the noise and timing controller comprises:
    a time domain noise detector, connected to the coordinate decision device, for detecting a noise interference based on the touch coordinate and generating an indicative signal when the noise interference exists;
    a frequency-hopping spread spectrum detector circuit, connected to the time domain noise detector, for performing a frequency hopping based on the indicative signal to generate a frequency hopping indicative signal representative of the frequency hopping;
    a frequency multiplexing controller, connected to the frequency-hopping spread spectrum detector circuit, for searching a set of candidate frequencies based on the frequency hopping indicative signal to find a cleanest driving frequency for output;
    an oscillator, connected to the frequency multiplexing controller, for generating an oscillation signal based on the cleanest driving frequency outputted by the frequency multiplexing controller; and a timing controller, connected to the oscillator, for generating the display driving signal and the switch signal based on the oscillation signal.

11. The panel system as claimed in claim 7, wherein the common voltage is a DC common voltage or an AC common voltage.

12. A driving method for an in-cell multi-touch panel system with low noise and time division multiplexing including an in-cell touch display panel and a touch display control system, the in-cell touch display panel having a common voltage and touch driving signal applied to N second conductor lines during displaying period and touch sensing period respectively, the driving method comprising the steps of:
  (A) selecting a frequency from a set of candidate frequencies to generate a display driving signal and a touch driving signal, such that the touch display control system sequentially outputs the display driving signal to the in-cell touch display panel for performing a display of an image signal, and sequentially outputs the touch driving signal to the in-cell touch display panel for sampling a sensing voltage from the in-cell touch display panel, so as to determine whether there is an approaching external object;
  (B) during a first frame time interval, sampling the sensing voltage from the in-cell touch display panel when the touch display control system drives the in-cell touch display panel, so as to determine whether there is an approaching external object and noise interference;
  (C) during a second frame time interval, using the touch display control system to change with the candidate frequencies and find out a frequency of the touch driving signal with minimum noise when there is noise interference; and
  (D) during a third frame time interval, using the touch display control system to generate the touch driving signal corresponding to the frequency with the minimum noise so as to determine whether the external object approaches to the in-cell touch display panel.

13. The driving method as claimed in claim 12, wherein the in-cell touch display panel comprises a thin film transistor (TFT) layer with K gate driving lines and L source driving lines, and a sensing electrode layer with M first conductor lines, where K, L, M are each a positive integer and K has a value greater than N, and wherein the M first conductor lines and the L second source driving lines are disposed on a first direction, the K gate driving lines and the N second conductor lines are disposed on a second direction, a mutual capacitance is formed on each overlap between the first conductor lines and the second conductor lines, and the first direction is substantially vertical to the second direction.

14. The driving method as claimed in claim 13, wherein the touch display control system is connected to the TFT layer, the sensing electrode layer, and the common voltage and touch driving layer for sequentially providing the display driving signal to the K gate driving lines to turn on a corresponding transistor and sequentially providing the display pixel signal to the L source driving lines to charge the capacitor of a corresponding pixel through the corresponding transistor so as to perform the display operation, and the touch display control system sequentially provides the touch driving signal to the N second conductor lines and samples a sensing voltage from the M first conductor lines for determining whether there is an approaching external object.

15. The driving method as claimed in claim 14, wherein the K gate driving lines are divided into N groups, each corresponding to one second conductor line such that the second conductor line is connected to the common voltage when the group receives the display driving signal and, if the touch display control system provides the touch driving signal to an i-th second conductor line, the touch display control system first determines whether the display driving signal is concurrently provided to a corresponding i-th group of gate driving lines, otherwise provides the touch driving signal to the i-th second conductor line, where i=1 to N.

16. The driving method as claimed in claim 12, wherein step (B) comprises:
  (B1) comparing a current two-dimensional touch data of the in-cell touch display panel with a two-dimensional touch reference data to calculate a data difference;
  (B2) determining whether the data difference is over a first threshold;
  (B3) calculating a whole data difference when the data difference is not over the first threshold;
  (B4) determining whether there is noise interference based on the whole data difference; and
  (B5) configuring the current two-dimensional touch data when there is no noise interference.

17. The driving method as claimed in claim 16, wherein step (C) is executed when step (B4) determines that there is noise interference.

18. The driving method as claimed in claim 17, wherein step (C) comprises:
  (C1) selecting a different frequency from the set of candidate frequencies to generate the touch driving signal for driving the in-cell touch display panel;
  (C2) reading a two-dimensional touch data of the in-cell touch display panel to calculate the whole data difference with respect to all corresponding data of the two-dimensional touch reference data; and
  (C3) selecting a frequency of the touch driving signal with a minimum whole data difference.

* * * * *